US010528123B2

(12) United States Patent
McCracken et al.

(10) Patent No.: US 10,528,123 B2
(45) Date of Patent: Jan. 7, 2020

(54) AUGMENTED RIDE SYSTEM AND METHOD

(71) Applicant: Universal City Studios LLC, Universal City, CA (US)

(72) Inventors: Sean David McCracken, Orlando, FL (US); Justin Michael Schwartz, Orlando, FL (US); Thomas Martin Geraghty, Orlando, FL (US)

(73) Assignee: Universal City Studios LLC, Universal City, CA (US)

(*) Notice: Subject to any disclaimer, the term of this patent is extended or adjusted under 35 U.S.C. 154(b) by 14 days.

(21) Appl. No.: 15/909,694

(22) Filed: Mar. 1, 2018

(65) Prior Publication Data

US 2018/0253141 A1 Sep. 6, 2018

Related U.S. Application Data

(60) Provisional application No. 62/467,817, filed on Mar. 6, 2017.

(51) Int. Cl.
*G06F 3/01* (2006.01)
*G06T 19/00* (2011.01)
(Continued)

(52) U.S. Cl.
CPC ............ *G06F 3/011* (2013.01); *A63F 13/211* (2014.09); *A63F 13/213* (2014.09);
(Continued)

(58) Field of Classification Search
None
See application file for complete search history.

(56) References Cited

U.S. PATENT DOCUMENTS 5,844,530 A 12/1998 Tosaki
6,220,965 B1 4/2001 Hanna et al.
(Continued)

FOREIGN PATENT DOCUMENTS

EP 2138213 A1 12/2009
EP 2189200 A1 5/2010
(Continued)

OTHER PUBLICATIONS

Fred H. Previc et al: "Spatial Disorientation in Aviation, vol. 203 of Progress in astronautics and aeronautics", p. 476, XP055489810, Jan. 1, 2004.
(Continued)

*Primary Examiner* — Vu Nguyen
(74) *Attorney, Agent, or Firm* — Fletcher Yoder, P.C.

(57) ABSTRACT

A ride system includes a ride vehicle configured to accommodate a passenger and travel along a ride path during a ride in an amusement park, a head mounted display connected to the ride vehicle and configured to be worn by the passenger, and a ride and game control system integrated with the ride vehicle and configured to coordinate a ride experience of the passenger with events occurring during the ride using at least the head mounted display and the ride vehicle. The ride and game control system includes a user interface, a ride controller, and a monitoring system. The ride and game control system also includes a computer graphics generation system communicatively coupled to the head mounted display and configured to selectively generate AR features for display on the head mounted display based on data received from the ride controller, the monitoring system, the user interface, or any combination thereof.

18 Claims, 8 Drawing Sheets

(51) Int. Cl.
  *A63G 7/00* (2006.01)
  *G02B 27/01* (2006.01)
  *A63G 31/16* (2006.01)
  *A63F 13/213* (2014.01)
  *A63F 13/26* (2014.01)
  *A63F 13/30* (2014.01)
  *G06F 3/0484* (2013.01)
  *H04N 13/344* (2018.01)
  *A63F 13/25* (2014.01)
  *A63F 13/211* (2014.01)
  *A63F 13/837* (2014.01)
  *A63F 13/245* (2014.01)
  *A63F 13/355* (2014.01)
  *A63F 13/843* (2014.01)
  *A63F 13/5255* (2014.01)
  *A63G 27/00* (2006.01)
  *A63G 31/00* (2006.01)
  *G06F 1/16* (2006.01)
  *G06F 3/0481* (2013.01)

(52) U.S. Cl.
  CPC ............ *A63F 13/245* (2014.09); *A63F 13/25* (2014.09); *A63F 13/26* (2014.09); *A63F 13/30* (2014.09); *A63F 13/355* (2014.09); *A63F 13/5255* (2014.09); *A63F 13/837* (2014.09); *A63F 13/843* (2014.09); *A63G 7/00* (2013.01); *A63G 27/00* (2013.01); *A63G 31/00* (2013.01); *A63G 31/16* (2013.01); *G02B 27/0101* (2013.01); *G02B 27/017* (2013.01); *G02B 27/0172* (2013.01); *G06F 1/163* (2013.01); *G06F 3/012* (2013.01); *G06F 3/04845* (2013.01); *G06T 19/006* (2013.01); *H04N 13/344* (2018.05); *A63F 2300/6653* (2013.01); *G02B 2027/014* (2013.01); *G02B 2027/0138* (2013.01); *G02B 2027/0141* (2013.01); *G02B 2027/0145* (2013.01); *G02B 2027/0178* (2013.01); *G06F 3/04815* (2013.01); *G06F 2203/04806* (2013.01); *G06T 2219/024* (2013.01)

(56) References Cited

U.S. PATENT DOCUMENTS

| | | | |
|---|---|---|---|
| 6,462,769 B1 | 10/2002 | Trowbridge et al. |
| 6,533,670 B1 | 3/2003 | Drobnis |
| 6,606,953 B2 | 8/2003 | Mares |
| 6,796,908 B2 | 9/2004 | Weston |
| 7,495,638 B2 | 2/2009 | Lamvik et al. |
| 7,955,168 B2 | 6/2011 | Mendelsohn et al. |
| 8,025,581 B2 | 9/2011 | Bryan et al. |
| 8,066,576 B2 | 11/2011 | Threlkel |
| 8,212,859 B2 | 7/2012 | Tang et al. |
| 8,491,403 B2 | 7/2013 | Schreibfeder |
| 8,511,827 B2 | 8/2013 | Hua et al. |
| 8,576,276 B2 | 11/2013 | Bar-Zeev et al. |
| 8,705,177 B1 | 4/2014 | Miao |
| 8,767,014 B2 | 7/2014 | Vaught et al. |
| 8,810,482 B2 | 8/2014 | Abdollahi et al. |
| 8,867,139 B2 | 10/2014 | Gupta |
| 8,894,492 B2 | 11/2014 | Ackley et al. |
| 8,941,559 B2 | 1/2015 | Bar-Zeev et al. |
| 9,052,505 B2 | 6/2015 | Cheng et al. |
| 9,092,953 B1 | 7/2015 | Mortimer et al. |
| 9,155,971 B1 | 10/2015 | Trowbridge |
| 9,253,524 B2 | 2/2016 | Kaburlasos et al. |
| 9,266,028 B2 | 2/2016 | Alfieri et al. |
| 9,268,138 B2 | 2/2016 | Shimizu et al. |
| 9,285,871 B2 | 3/2016 | Geisner et al. |
| 9,286,730 B2 | 3/2016 | Bar-Zeev et al. |
| 9,292,973 B2 | 3/2016 | Bar-Zeev et al. |
| 9,310,591 B2 | 4/2016 | Hua et al. |
| 9,316,834 B2 | 4/2016 | Makino et al. |
| 9,342,610 B2 | 5/2016 | Liu et al. |
| 9,354,446 B2 | 5/2016 | Abdollahi et al. |
| 9,360,671 B1 | 6/2016 | Zhou |
| 9,366,870 B2 | 6/2016 | Cheng et al. |
| 9,366,871 B2 | 6/2016 | Ghosh et al. |
| 9,383,582 B2 | 7/2016 | Tang et al. |
| 9,389,423 B2 | 7/2016 | Bhardwaj et al. |
| 9,395,811 B2 | 7/2016 | Vaught et al. |
| 9,454,010 B1 | 9/2016 | Passmore et al. |
| 9,497,501 B2 | 11/2016 | Mount et al. |
| 9,519,144 B2 | 12/2016 | Lanman et al. |
| 9,569,886 B2 | 2/2017 | Akenine-Moller et al. |
| 9,582,922 B2 | 2/2017 | Lanman et al. |
| 9,588,341 B2 | 3/2017 | Bar-Zeev et al. |
| 9,606,362 B2 | 3/2017 | Passmore et al. |
| 9,638,921 B2 | 5/2017 | Miller et al. |
| 9,658,460 B2 | 5/2017 | Lee et al. |
| 9,690,371 B2 | 6/2017 | Saito |
| 9,690,374 B2 | 6/2017 | Clement et al. |
| 9,690,375 B2 | 6/2017 | Blum et al. |
| 9,733,477 B2 | 8/2017 | Gupta |
| 9,733,480 B2 | 8/2017 | Baek et al. |
| 9,733,481 B2 | 8/2017 | Carollo et al. |
| 9,741,125 B2 | 8/2017 | Baruch et al. |
| 9,763,342 B2 | 9/2017 | Long et al. |
| 9,778,467 B1 | 10/2017 | White et al. |
| 9,839,857 B2 | 12/2017 | Wagner |
| 9,864,406 B2 | 1/2018 | Miller et al. |
| 9,869,862 B2 | 1/2018 | Cheng et al. |
| 9,874,749 B2 | 1/2018 | Bradski et al. |
| 9,877,016 B2 | 1/2018 | Esteban et al. |
| 9,885,871 B2 | 2/2018 | Abdollahi et al. |
| 9,933,624 B1 | 4/2018 | White et al. |
| 2006/0250322 A1 | 11/2006 | Hall et al. |
| 2008/0188318 A1 | 8/2008 | Piccionelli et al. |
| 2010/0131865 A1 | 5/2010 | Ackley et al. |
| 2011/0141246 A1 | 6/2011 | Schwartz et al. |
| 2011/0242134 A1 | 10/2011 | Miller et al. |
| 2012/0320100 A1 | 12/2012 | Machida et al. |
| 2013/0137076 A1 | 5/2013 | Perez et al. |
| 2013/0141419 A1 | 6/2013 | Mount et al. |
| 2013/0286004 A1* | 10/2013 | McCulloch ........... G06T 19/006 345/419 |
| 2014/0118829 A1 | 5/2014 | Ma et al. |
| 2014/0146394 A1 | 5/2014 | Tout et al. |
| 2014/0364208 A1 | 12/2014 | Perry |
| 2014/0364209 A1 | 12/2014 | Perry |
| 2014/0364212 A1 | 12/2014 | Osman et al. |
| 2015/0003819 A1 | 1/2015 | Ackerman et al. |
| 2015/0090242 A1 | 4/2015 | Weston et al. |
| 2015/0097863 A1 | 4/2015 | Alaniz et al. |
| 2015/0100179 A1 | 4/2015 | Alaniz et al. |
| 2015/0103152 A1 | 4/2015 | Qin |
| 2015/0190726 A1 | 7/2015 | Frolov |
| 2015/0312561 A1 | 10/2015 | Hoof et al. |
| 2015/0363976 A1 | 12/2015 | Henson |
| 2016/0048203 A1 | 2/2016 | Blum et al. |
| 2016/0062454 A1 | 3/2016 | Wang et al. |
| 2016/0089610 A1 | 3/2016 | Boyle et al. |
| 2016/0097929 A1 | 4/2016 | Yee et al. |
| 2016/0097930 A1 | 4/2016 | Robbins et al. |
| 2016/0098095 A1 | 4/2016 | Gonzalez-Banos et al. |
| 2016/0171779 A1 | 6/2016 | Bar-Zeev et al. |
| 2016/0188943 A1 | 6/2016 | Franz |
| 2016/0196694 A1 | 7/2016 | Lindeman |
| 2016/0210784 A1 | 7/2016 | Ramsby et al. |
| 2016/0240013 A1 | 8/2016 | Spitzer |
| 2016/0346704 A1 | 12/2016 | Wagner |
| 2016/0353089 A1 | 12/2016 | Gallup et al. |
| 2016/0353095 A1* | 12/2016 | Tait ................ H04N 13/363 |
| 2016/0364907 A1 | 12/2016 | Schoenberg |
| 2016/0370855 A1 | 12/2016 | Lanier et al. |
| 2016/0377869 A1 | 12/2016 | Lee et al. |
| 2016/0379417 A1 | 12/2016 | Mount et al. |
| 2017/0053445 A1 | 2/2017 | Chen et al. |
| 2017/0053446 A1 | 2/2017 | Chen et al. |

(56) References Cited

U.S. PATENT DOCUMENTS

| | | | |
|---|---|---|---|
| 2017/0053447 A1 | 2/2017 | Chen et al. | |
| 2017/0059831 A1 | 3/2017 | Hua et al. | |
| 2017/0103571 A1* | 4/2017 | Beaurepaire | G01C 21/3667 |
| 2017/0116950 A1 | 4/2017 | Onal | |
| 2017/0131581 A1 | 5/2017 | Pletenetskyy | |
| 2017/0171538 A1 | 6/2017 | Bell et al. | |
| 2017/0176747 A1 | 6/2017 | Vallius et al. | |
| 2017/0178408 A1 | 6/2017 | Bavor, Jr. et al. | |
| 2017/0193679 A1 | 7/2017 | Wu et al. | |
| 2017/0208318 A1 | 7/2017 | Passmore et al. | |
| 2017/0212717 A1 | 7/2017 | Zhang | |
| 2017/0220134 A1 | 8/2017 | Burns | |
| 2017/0221264 A1 | 8/2017 | Perry | |
| 2017/0225084 A1* | 8/2017 | Snyder | A63G 7/00 |
| 2017/0236332 A1 | 8/2017 | Kipman et al. | |
| 2017/0242249 A1 | 8/2017 | Wall et al. | |
| 2017/0255011 A1 | 9/2017 | Son et al. | |
| 2017/0262046 A1 | 9/2017 | Clement et al. | |
| 2017/0262047 A1 | 9/2017 | Saito | |
| 2017/0270841 A1 | 9/2017 | An et al. | |
| 2017/0277256 A1 | 9/2017 | Burns et al. | |
| 2017/0285344 A1 | 10/2017 | Benko et al. | |
| 2017/0293144 A1 | 10/2017 | Cakmakci et al. | |
| 2017/0316607 A1 | 11/2017 | Khalid et al. | |
| 2017/0323416 A1 | 11/2017 | Finnila | |
| 2017/0323482 A1 | 11/2017 | Coup et al. | |
| 2017/0336863 A1 | 11/2017 | Tilton et al. | |
| 2017/0337737 A1 | 11/2017 | Edwards et al. | |
| 2017/0345198 A1 | 11/2017 | Magpuri et al. | |
| 2017/0363872 A1 | 12/2017 | Border et al. | |
| 2017/0363949 A1 | 12/2017 | Valente et al. | |
| 2017/0364145 A1 | 12/2017 | Blum et al. | |
| 2018/0003962 A1 | 1/2018 | Urey et al. | |
| 2018/0018515 A1 | 1/2018 | Spizhevoy et al. | |
| 2018/0024370 A1 | 1/2018 | Carolio et al. | |
| 2018/0032101 A1 | 2/2018 | Jiang | |
| 2018/0033199 A9 | 2/2018 | Eatedali et al. | |
| 2018/0040163 A1* | 2/2018 | Donnelly | G06T 19/006 |
| 2018/0059715 A1 | 3/2018 | Chen et al. | |
| 2018/0059776 A1 | 3/2018 | Jiang et al. | |
| 2018/0095498 A1 | 4/2018 | Raffle et al. | |
| 2018/0104601 A1 | 4/2018 | Wagner | |
| 2018/0164594 A1 | 6/2018 | Lee et al. | |
| 2018/0196262 A1 | 7/2018 | Cage | |
| 2018/0203240 A1 | 7/2018 | Jones et al. | |

FOREIGN PATENT DOCUMENTS

| | | |
|---|---|---|
| FR | 2911463 A1 | 7/2008 |
| JP | 2012141461 A | 7/2012 |
| JP | 5790187 | 10/2015 |
| JP | 5801401 B2 | 10/2015 |
| JP | 2015228050 A | 12/2015 |
| JP | 5913346 B2 | 4/2016 |
| JP | 2016528942 A | 9/2016 |
| JP | 2017522911 A | 8/2017 |
| JP | 6191929 B2 | 9/2017 |
| JP | 6216100 B1 | 10/2017 |
| JP | 6237000 B2 | 11/2017 |
| JP | 2017532825 A | 11/2017 |
| JP | 6248227 B1 | 12/2017 |
| WO | 1998031444 | 7/1998 |
| WO | 9851385 A1 | 11/1998 |
| WO | 2008059086 A1 | 5/2008 |
| WO | 2016023817 A2 | 2/2016 |

OTHER PUBLICATIONS

Jiejie Zhu et al: "Handling occlusions in video-based augmented reality using depth information", Computer Animation and Virtual Worlds, vol. 21, No. 5, pp. 509-521, XP055184802, Sep. 13, 2010.

Anonymous: "Head-up display—Wikipedia", XP055489840, retrieved from the Internet: URL:https://en.wikipedia.org/w/index.php?title=Head-up_display&oldid=766263622, pp. 2-3, Feb. 19, 2017.

Anonymous: "Head-mounted display—Wikipedia", XP055489914, retrieved from the Internet: URL:https://en.wikipedia.org/w/index.php?title=Head-mounted_display&oldid=767462464, pp. 1-3, Feb. 26, 2017.

Anonymous: "Augmented reality—Wikipedia", XP55488978, retrieved from the Internet: URL:https://en.wikipedia.org/w/index.php?title=Augmented_reality&oldid=768706789, pp. 3-4, Mar. 5, 2017.

PCT/US2018/021154 International Search Report and Written Opinion dated Sep. 18, 2018.

* cited by examiner

AUGMENTED RIDE SYSTEM AND METHOD

CROSS REFERENCE TO RELATED APPLICATION

This application claims priority to and benefit of U.S. Provisional Patent Application No. 62/467,817, entitled "SYSTEMS AND METHODS FOR DIGITAL OVERLAY IN AN AMUSEMENT PARK ENVIRONMENT," filed Mar. 6, 2017, which is herein incorporated by reference in its entirety for all purposes.

BACKGROUND

The subject matter disclosed herein relates to amusement park attractions, and more specifically, to providing augmented experiences in amusement park attractions.

Amusement parks or theme parks may include various entertainment attractions in providing enjoyment to guests (e.g., families and/or people of all ages) of the amusement parks. For example, the attractions may include a ride attraction (e.g., closed-loop track, dark ride, thriller ride, or other similar ride), and there may be themed environments along the ride that may be traditionally established using equipment, furniture, building layouts, props, decorations, and so forth. Depending on the complexity of the themed environments, this could prove to be very difficult and time-consuming to setup and replace the themed environment. It may also be very difficult to setup a themed environment that is entertaining for all passengers on the ride. The same themed environment may be appealing to some passengers, but not others.

In addition, due to different motion paths and/or different view perspectives of the passengers in the ride vehicle, it may be difficult to provide the same ride experience to all passengers. For example, passengers sitting in the front row may have better view and thus a more immersive ride experience than passengers in the back row. It is now recognized that it is desirable to include attractions where it may be possible to change attraction themes, or to include or remove certain themed features in such attractions in a flexible and efficient manner relative to traditional techniques. It is also now recognized that it may be desirable to provide an immersive and more personalized or customized ride experience for all passengers.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In one embodiment, a ride system includes a ride vehicle configured to accommodate a passenger and configured to travel along a ride path during a ride in an amusement park, a head mounted display connected to the ride vehicle and configured to be worn by the passenger, and a ride and game control system integrated with the ride vehicle and configured to coordinate a ride experience of the passenger with events occurring during the ride using at least the head mounted display and the ride vehicle. The ride and game control system includes a user interface configured to receive inputs from the passenger, a ride controller configured to control physical operation of the ride vehicle based at least on data relating to operational parameters of the ride vehicle and the inputs from the passenger, and a monitoring system configured to monitor at least a position and an orientation of the head mounted display, a position and an orientation of the ride vehicle, or a combination thereof. The ride and game control system also includes a computer graphics generation system communicatively coupled to the head mounted display and configured to selectively generate AR features for display on the head mounted display based on data received from the ride controller, the monitoring system, the user interface, or any combination thereof.

In another embodiment, a method includes receiving and analyzing data via a ride and game control system integrated with a ride vehicle configured to accommodate one or more passengers, wherein the ride vehicle is configured to travel along a ride path during a ride in an amusement park, and wherein the data relates to the one or more passengers, or to the ride vehicle, or both. The method includes generating, via a computer graphics generation system of the ride and game control system, gaming effects based on the received and analyzed data, wherein the gaming effects comprise augmented reality (AR) graphics. The method also includes transmitting, via the computer graphics generation system, the AR graphics for display on a head mounted display configured to be worn by a respective passenger of the one or more passengers in the ride vehicle.

In another embodiment, a ride and game control system physically integrated with a ride vehicle configured to carry a passenger along a ride path includes a ride controller configured to receive real-time data related to an input control state from at least a user interface, and configured to receive data related to operational parameters of the ride vehicle. The ride and game control system includes a game controller communicatively coupled to the ride controller and configured to push updates relating to the input control state and at least one of the operational parameters to features of the ride vehicle. The ride and game control system also includes a computer graphics generation system communicatively coupled to the game controller and to a head mounted display configured to be worn by the passenger, wherein the computer graphics generation system is configured to selectively render augmented reality (AR) graphics for display on the head mounted display based at least on the updates from the game controller.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
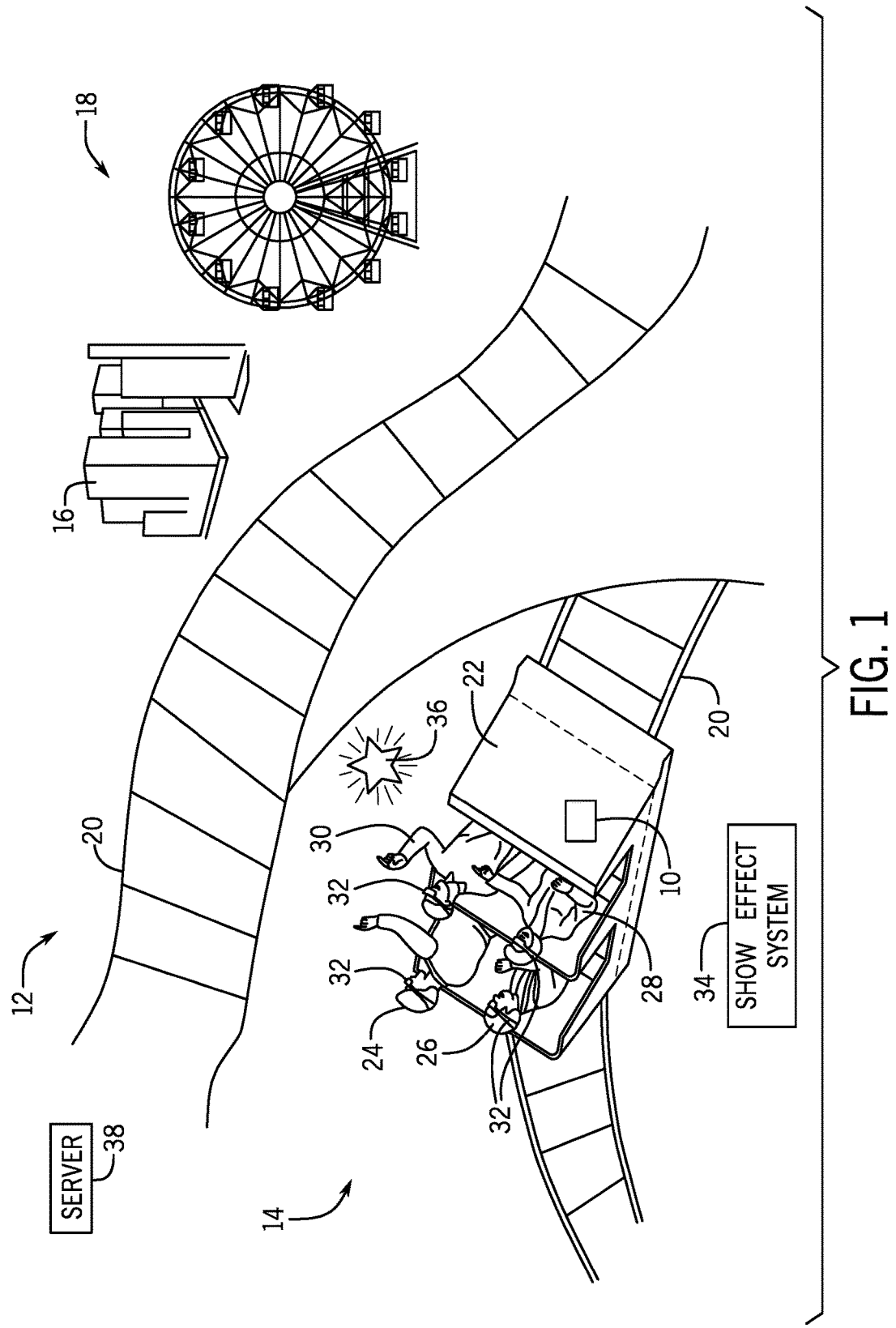
FIG. 1 is a perspective view of an embodiment of a ride system that provides augmented reality (AR) experiences to passengers via head mounted displays, in accordance with present embodiments.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments relate to systems and methods of providing an enhanced experience for guests visiting a themed attraction, such as passengers on a ride (e.g., closed-loop track, dark ride, or other similar ride). The enhanced experience may be performed as the passengers travel a ride path in an amusement park or a theme park. In particular, a ride and game control system associated with an attraction may provide gaming effects resulting in an augmented reality (AR) experience by way of head mounted displays. The ride and game control system may provide other entertainment experiences using show effect systems (e.g., projection display devices, digital display devices, sound systems, lighting systems, etc.) disposed along the ride path. To provide more personalized and immersive AR experiences, the ride and game control system may selectively provide an AR experience based on a passenger's viewing interest and/or engagement in gameplay associated with the ride. As one example, the ride and game control system may determine which real-world features (e.g., aspects of the physical amusement park attractions) the passenger is looking at, and may provide the AR experience according to the passenger's interest and may enable the passenger to interact (e.g., engaging, grabbing, selecting, targeting, moving, etc.) with AR features associated with the real-world features.

As another example, the ride and game control system may dynamically change perspectives of AR features, such that the passenger's visualization experience is not blocked or hindered by other passengers and/or real-world objects (e.g., by bringing the gaming and/or show effects right in front of the passenger's eyes). As another example, the ride and game control system may dynamically provide and/or update the AR features corresponding to the engaged game effects by another passenger. Furthermore, the ride and game control system may provide a real-time adaptive AR experience based on passengers' reactions and/or engagements. For example, presence and/or content of the AR features may be updated or changed in real-time based on how many passengers are looking, whether passengers appear to be enjoying the AR experience, whether passengers are engaging in an AR-based gameplay, and so forth.

While present embodiments may be implemented in a variety of settings, an example setting in which a ride and game control system 10 is used in an amusement park 12 is shown schematically in FIG. 1. As illustrated, the amusement park 12 may include a ride 14, themed attractions 16 (e.g., fixed equipment, building layouts, props, decorations, and so forth corresponding to the theme), and other amusement park attractions 18 (e.g., Ferris wheel or other attractions). In certain embodiments, the ride 14 may include a dark ride or other similar thrill ride, and may thus further include a vehicle path (e.g., a closed-loop track or a system of closed-loop tracks 20). The tracks 20 may be provided as an infrastructure on which a ride vehicle 22 may travel as passengers 24, 26, 28, and 30 are accommodated by the the ride vehicle 22. The tracks 20 may thus define the motion of the ride vehicle 22. However, in another embodiment, for example, the tracks 20 may be replaced by a controlled path, in which the movement of the ride vehicle 22 may be controlled via an electronic system, a magnetic system, or other similar system infrastructure other than the tracks 20. In other words, the ride path of the vehicle 22 may not be physically constrained to an exact path, thereby allowing the passengers 24, 26, 28, and 30 some degree of control over their motion path, view perspective, and so forth. It should be appreciated that while the ride vehicle 22 may be illustrated as a 4-passenger vehicle, in other embodiments, the passenger ride vehicle 22 may include any number of passenger spaces (e.g., 1, 2, 4, 8, 10, or more spaces) to accommodate a single or multiple groups of passengers. It should also be appreciated that while the ride 14 may be illustrated having one ride vehicle 22, the ride 14 may include any number of ride vehicles 22 (e.g., 1, 2, 4, 8, 10, or more). As the ride vehicle 22 travels along the tracks 20, the passengers may be provided a moving tour of the scenery (e.g., themed environment that may include fixed equipment, building layouts, props, decorations, and so forth corresponding to the theme). The scenery may include the environment surrounding the ride 14 and/or the environment within an infrastructure that may fully or partially house the ride 14.

While the passengers may find the ride 14 to be a very enjoyable experience, in certain embodiments, it may be useful to enhance their ride experience. Specifically, instead of having a physical view of only the scenery, the ride experience provided to the passengers 24, 26, 28, and 30 may be enhanced with gaming effects including augmented reality (AR) experience by way of head mounted displays 32. For example, as the ride vehicle 22 travels along the tracks 20, the ride and game control system 10 may coordinate AR images or features, such as AR objects 36, to be shown to the passengers 24, 26, 28, and 30 on their respective head mounted displays 32. In addition, the ride and game control system 10 may coordinate off-board (e.g., off the ride vehicle 22) entertainment to enhance the ride experience provided to the passengers 24, 26, 28, and 30. For example, as the ride vehicle 22 travels along the tracks 20, the ride and game control system 10 may coordinate visual and/or sound presentations provided by way of a show effect system 34 that may include a projection game computer, display devices (e.g., projection display devices, digital display devices), lighting systems, and sound effect devices (e.g., speakers) disposed along the tracks 20.

In some embodiments, the ride experience provided to the passengers 24, 26, 28, and 30 may be enhanced with game play including the AR experience. For example, certain embodiments of the ride 14 may involve passenger interaction with the AR images or features, for example simulated interaction with the AR objects 36 as the ride vehicle 22 passes by or through the AR objects 36. Certain embodiments of the ride vehicle 22 may be user-controlled, and one aspect of a game may be to interact with various AR objects 36 by directing the ride vehicle 22 toward the AR objects 36 and/or avoid colliding certain AR objects 36 by steering away from them. The simulated interaction may cause the AR objects 36 to be affected according to certain predetermined or modeled responses stored by the ride and game control system 10. As an example, the predetermined or modeled responses may be implemented by a physics model, engine or similar module implemented by the ride and game control system 10.

Further, the ride and game control system 10 may coordinate these gaming effects including the on-board (e.g., on the ride vehicle 22) AR and the off-board (e.g., off the ride vehicle 22) entertainment experience set forth above to collectively enhance the ride experience of the passengers 24, 26, 28, and 30. For example, the ride and game control system 10 may be communicatively coupled to a server 38 (e.g., a remote server, an on-site server, or an outboard server) via a wireless communication network (e.g., wireless local area networks [WLAN], wireless wide area networks [WWAN], near field communication [NFC]). The server 38 may be a master game server that coordinates the on-board and off-board experiences. In some embodiments, the server 38 may store and/or process user information of the passengers 24, 26, 28, and 30, such that the ride and game control system 10 may provide personalized gaming effects to the passengers based on the user information. The user information may include any suitable information provided by or authorized by the users, such as payment information, membership information, personal information (e.g., age, height, special needs, etc.), gaming information (e.g., information about the video game associated with the themed attractions 16, information about a particular character the user is associated with in the video game, information about game history of the user), and so forth.

Figure 2:
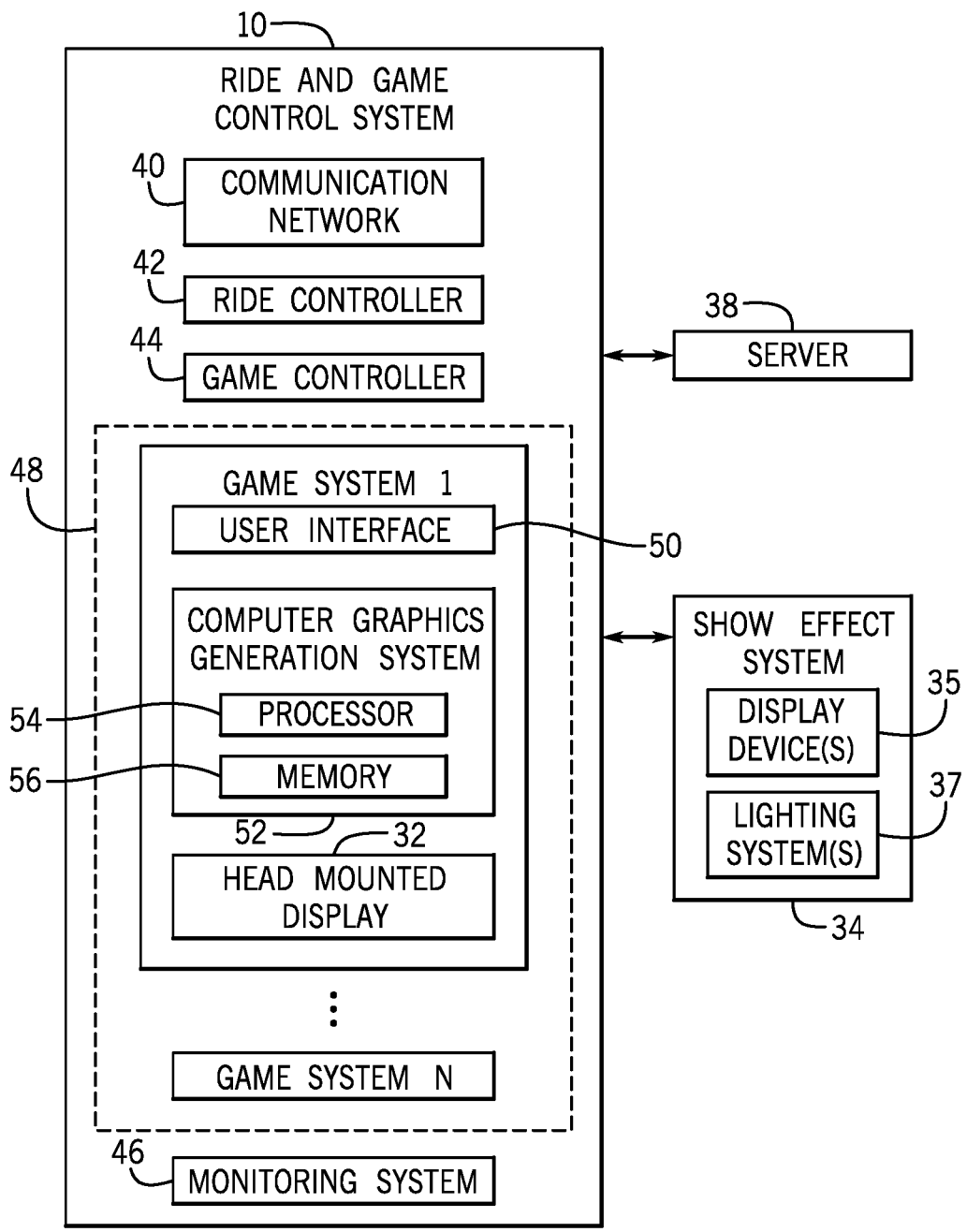
FIG. 2 is a block diagram of an embodiment of a ride and game control system used in the ride system of FIG. 1, in accordance with present embodiments.

FIG. 2 is a block diagram of various components of the ride and game control system 10. In the illustrated embodiment, the ride and game control system 10 may be a dedicated system disposed on or integrated with the ride vehicle 22. The ride and game control system 10 may include a communication network 40 (e.g., wired and/or wireless communication network, such as WLAN, WWAN, and NFC), a ride controller 42, a game controller 44, a monitoring system 46, and one or more game systems 48. The communication network 40 may communicatively couple the ride and game control system 10 to the server 38 and the show effect system 34 that may include a projection game computer, one or more display devices 35, one or more lighting systems 37, and other devices (e.g., sound systems, speakers) disposed along the tracks 20. The communication network 40 may also communicatively couple the various on-board components (e.g., the ride controller 42, the game controller 44, the monitoring system 46, the one or more game systems 48, the head mounted displays 32) to one another.

The ride controller 42 may be a programmable logic controller (PLC), or other suitable control device. The ride controller 42 may include a processor (e.g., a general-purpose processor, a system-on-chip (SoC) device, an application-specific integrated circuit (ASIC), or some other similar processor configuration) operatively coupled to a memory (e.g., a tangible non-transitory computer-readable medium and/or other storage device) to execute instructions for tracking operational parameters or formation of the ride vehicle 22. For example, the operational parameters or information of the ride vehicle 22 may include, but is not limited to, position (e.g., with precision level in the range of millimeters), yaw, pitch roll, and velocity of the ride vehicle 22, and input control state (e.g., input provided by one or more of the passengers to drive the ride vehicle 22). In some embodiments, the ride controller 42 may also be configured to control or change physical operation of the ride vehicle 22 based on the input control state provided by one or more of the passengers (e.g., to change the position, yaw, pitch roll, and the velocity of the ride vehicle 22).

The game controller 44 may be a programmable logic controller (PLC), or other suitable control device. The game controller 44 may include a processor (e.g., a general-purpose processor, a system-on-chip (SoC) device, an application-specific integrated circuit (ASIC), or some other similar processor configuration) operatively coupled to a memory (e.g., a tangible non-transitory computer-readable medium and/or other storage device) to execute instructions stored in the memory. The game controller 44 may be configured to provide operational parameters or information relating to the ride vehicle 22 (e.g., a summed game state of the ride vehicle 22) to the one or more game systems 48 and/or the server 38. The operational parameters or information may include, but is not limited to position, yaw, pitch roll, and the velocity of the ride vehicle 22. In some embodiments, the game controller 44 may transmit the operational parameters or information via user datagram protocol (UDP) to the one or more game systems 48 and/or the server 38. It may be appreciated that data transmission via UDP may incur less delay, making an appealing choice for delay-sensitive applications, such as the presently disclosed techniques of generating the personalized immersive ride experience.

The monitoring system 46 may include any suitable sensors and/or computing systems disposed on or integrated with the ride vehicle 22 to track the positions, locations, orientations, presences, and so forth of the passengers (e.g., the passengers 24, 26, 28, and 30) and/or the position, location, or orientation of the ride vehicle 22. Such sensors may include orientation and position sensors (e.g., accelerometers, magnetometers, gyroscopes, Global Positioning System [GPS] receivers), motion tracking sensors (e.g., electromagnetic and solid-state motion tracking sensors), inertial measurement units (IMU), presence sensors, and others. The information obtained by the monitoring system 46 may be useful in determining each passenger's gaze direction, viewing perspective, field of view, viewing interest, interaction with the game, and so forth. In some embodiments, the monitoring system 46 may also receive data obtained by the head mounted display 32 indicative of the respective passenger's gaze direction, viewing perspective, field of view, viewing interest, interaction with the game, and so forth (e.g., position and orientation data of the head mounted display 32).

The one or more game systems 48, generally, may be configured to render virtual or augmented graphics for overlay onto real-world environmental views. The one or more game systems 48 may also be responsible for game logic, and to run simulations of real world ride vehicles and stage geometry for the placement of virtual objects in real space. In certain embodiments, the one or more game systems 48 are configured to provide AR and/or game play experiences to the passengers (e.g., the passengers 24, 26, 28, and 30). In particular, each seat of the ride vehicle 22 may include a dedicated game system 48. In some embodiments, the one or more game systems 48 may be communicatively coupled to one another, such that the passengers may engage in a shared game (e.g., a game having multiple players). The one or more game systems 48 may be communicatively coupled (directly or indirectly) to the game controller 44, the monitoring system 46, the server 38, and the show effect system 34. Each of the one or more game systems 48 may include a user interface 50 and a computer graphics generation system 52. The user interface 50 may be communicatively coupled to the computer graphics generation system 52 and the computer graphics generation system 52 may be communicatively coupled to a respective head mounted display 32 (e.g., via the communication network 40).

The user interface 50 may include one or more user input devices (e.g., handheld controllers, joysticks, push buttons) disposed on the ride vehicle 22 to enable the passenger to provide inputs. For example, the user interface 50 may be configured to enable different actions and/or effects to be applied in the AR environment. For example, the user interface 50 may enable the passenger to control a character or an object of the AR features in different directions (e.g., up, down, left, right) in the AR environment. By way of a more specific example, the user interface 50 may enable the passenger to make selections or grab/release objects of the AR features in the AR environment. In some embodiments, the user interface 50 may enable the passenger to control operation of the ride vehicle 22, such as changing its velocity and/or direction. In some embodiments, the user interface 50 may also include a display screen and/or a touch screen to enable ride and game related information to be communicated to the passenger.

The computer graphics generation system 52 may generate and transmit AR graphics to be displayed on the respective head mounted display 32, such that the respective passenger may enjoy the immersive ride experience enhanced by the AR experience. The computer graphics generation system 52 includes processing circuitry, such as a processor 54 (e.g., general purpose processor or other processor) and a memory 56, and may process data useful in generating an AR experience for the respective passenger. The data useful in generating the AR experience may include, but is not limited to, real-time data received from the head mounted display 32, the user interface 50, and the game controller 44 (e.g., including data from the ride controller 42, the monitoring system 46, the server 38), and data stored in the memory 56.

The computer graphics generation system 52 may use such data to generate a frame of reference to register AR graphics to the real-world environment, for example to the generated real-world images or to the actual physical environment. Specifically, in certain embodiments, using the frame of reference generated based on orientation data, position data, point of view data, motion tracking data, and so forth, the computer graphics generation system 52 may render a view of the AR graphics in a manner that is temporally and spatially commensurate with what the respective passenger would perceive if not wearing the head mounted display 32. The computer graphics generation system 52 may store a model of the ride 14 that is built using spatial information of the real-word physical features of the ride 14 including the themed environment. The model is used, together with other inputs, e.g., from the ride controller 42, the game controller 44, the monitoring system 46 and/or the head mounted display 32, to locate the respective passenger and determine the passenger's gaze direction and/or field of view. The model may be used to provide display signals to the head mounted display 32 that are dynamically updated as the passenger travels along the tracks 20.

For example, the computer graphics generation system 52 may selectively generate AR graphics to reflect changes in the respective passenger's orientation, position, gaze direction, field of view, motion, and so forth. The computer graphics generation system 52 may selectively generate AR graphics based on data indicative of the position, a yaw, and a velocity, and/or other operational parameters of the ride vehicle 22 received from the monitoring system 46. The computer graphics generation system 52 may also selectively generate the AR graphics to reflect changes in inputs provided by the respective passenger using the user interface 50. Furthermore, the computer graphics generation system 52 may generate the AR graphics based on simulated interactions that may cause the AR objects to be affected according to certain predetermined or modeled responses stored by the computer graphics generation system 52 (e.g., in the memory 56). As an example, the predetermined or modeled responses may be implemented by a physics engine or similar module or as a part of the computer graphics generation system 52. In certain embodiments, the computer graphics generation system 52 may track the information or data set forth above corresponding to a plurality of passengers (e.g., the passengers 24, 26, 28, and 30) in a shared game, such that the passengers in the shared game may see the game effects applied by other players in the shared game.

Figure 3:
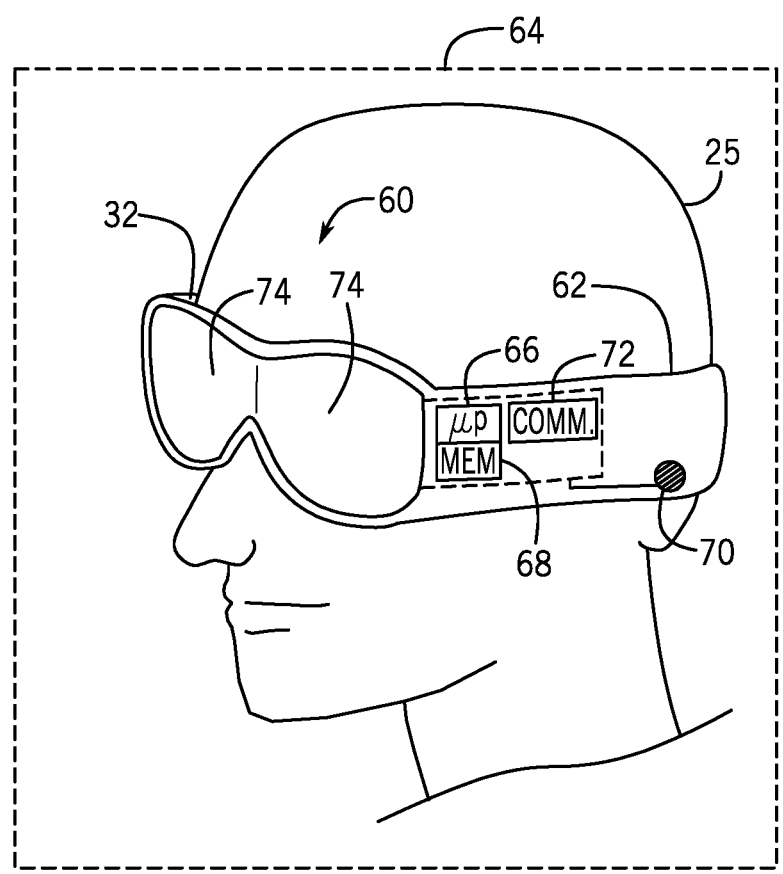
FIG. 3 is a perspective view of an example embodiment of the head mounted display of FIG. 1, in accordance with present embodiments.

FIG. 3 is an illustration of an embodiment of the head mounted display 32. In some embodiments, the head mounted display 32 may be coupled to (e.g., tethered via a cable or a wire) the ride vehicle 22. In some embodiments, the passenger of the ride vehicle 22 may purchase or otherwise be provided the head mounted display 32. The head mounted display 32 may include electronic eyeglasses 60 (e.g., AR eyeglasses, goggles) and a wearable portion 62 configured to house at least a portion of the electronic eyeglasses 60. The head mounted display 32 may be used alone or in combination with other features to create a surreal environment 64 (e.g., AR environment), which may include an AR experience or other similar surreal environment for a passenger 25. Specifically, the head mounted display 32 may be worn by the passenger 25 throughout the duration of the ride The head mounted display 32 may include a processor 66 and a memory 68 (e.g., a tangible non-transitory computer-readable medium). The processor 66 and the memory 68 may be configured to allow the head mounted display 32 to function as a display (e.g., to receive signals from the computer graphics generation system 52 that ultimately drive the display). The processor 66 may be a general-purpose processor, system-on-chip (SoC) device, an application-specific integrated circuit (ASIC), or some other similar processor configuration.

The head mounted display 32 may include a tracking system 70 that may include orientation and/or position sensors, such as accelerometer, magnetometer, gyroscopes, GPS receiver, motion tracking sensor, electromagnetic and solid-state motion tracking sensor, IMU, presence sensor, and others. The tracking system 70 may collect real-time data indicative of the passenger's position, orientation, focal length, gaze direction, field of view, motion, or any combination thereof. The head mounted display 32 may include a communication interface 72 (e.g., including a wireless transceiver) that may transmit the real-time data captured via the tracking system 70 to the processor 66 and/or the computer graphics generation system 52 for processing. The communication interface 72 may also enable the head mounted display 32 to receive the display signal transmitted by the computer graphics generation system 52.

The electronic eyeglasses 60 of the head mounted display 32 may include one or more displays 74. The one or more displays 74 may include a see-through display surface onto which images are projected, such as a see-through liquid crystal display (LCD), a see-through organic light emitting diode (OLED) display, or other similar display useful in displaying the real world and the AR graphical images to the passenger 25. For example, the passenger 25 may view the AR graphics appearing on the respective displays 74 as an overlay to the actual and physical real world environment. In accordance with the present embodiments, the head mounted display 32 may receive, via the communication interface 72, the display signal (e.g., AR graphics together with the respective overlay information, such as spatial and/or temporal information with respect to the one or more displays 74), such that the head mounted display 32 may process and overlay, via the processor 66, the AR graphics on the one or more displays 74 so that the passenger 25 perceives that the AR graphics are integrated into the real world environment. In some embodiments, the head mounted display 32 may include one or more sound devices (e.g., earphones, speakers, microphones).

Figure 4:
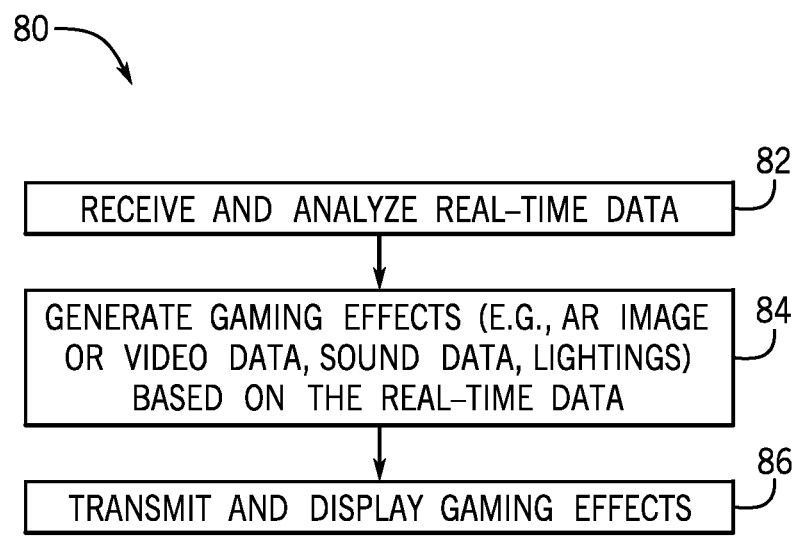
FIG. 4 is a flow diagram illustrating an embodiment of a process for creating an AR-enhanced immersive experience using the ride and game control system of FIG. 1, in accordance with present embodiments.

FIG. 4 is a flow diagram of an embodiment of a process 80 to provide gaming effects (e.g., on-board and off-board entertainment experiences) to enhance the overall ride experience of the passengers of the ride vehicle 22. The process 80 may be implemented by a combination of the ride and game control system 10, the head mounted display 32, and/or the show effect system 34. The process 80 may be representative of initiated code or instructions stored in a non-transitory computer-readable medium (e.g., the memory 56) and executed, for example, by the processor 54 included in the computer graphics generation system 52, the processor 66 in the head mounted display 32, or both. The process 80 may include receiving (block 82) and analyzing real-time data and/or data related to the passengers. It should be noted that the data received and/or analyzed in block 82 may be provided from various components of the ride and game control system 10 and/or components coupled to the ride and game control system 10 (e.g., the head mounted displays 32, the server 38, the ride controller 42, the game controller 44, the monitoring system 46, the one or more game systems 48, the user interfaces 50).

By way of example, the real-time data may include operational parameters or information of the ride vehicle 22 (e.g., from the ride controller 42, the game controller 44, the user interface 50, or a combination thereof) that may include, but is not limited to, position, yaw, pitch roll, and velocity of the ride vehicle 22. The real-time data may include inputs provided by one or more of the passengers (e.g., from the user interfaces 50) to drive the ride vehicle 22. Input provided by the passengers may include a request to change the position, yaw, pitch roll, and/or velocity of the ride vehicle 22. The real-time data may include position/orientation data of each passenger (e.g., from the ride controller 42, the game controller 44, the monitoring system 46, the head mounted displays 32). Such data may relate to or otherwise indicate the passenger's position, orientation, gaze direction, field of view, or any combination thereof. The real-time data may include user-input data (e.g., from the user interfaces 50) that may indicate interaction with or control of AR features, such as grabbing or releasing AR objects. As may be appreciated, the real-time data may be useful in determining each passenger's current state during the ride (e.g., the current position and/or orientation of the passenger, what the passenger is looking at, the passenger's interaction with AR features in the surreal environment 64).

The data received and analyzed at block 82 also includes data related to the passengers. For example, the data related to the passengers may include, but is not limited to, the passenger's identification and game history (e.g., from the server 38). As may be appreciated, the data related to the passengers may be useful in determining appealing AR features and/or other appealing visual and/or sound presentations for a respective passenger. In some embodiments, the real-time data and/or the data related to the passengers received by the processor 54 of each game system 48 (at block 82) may be shared among one another, such that the overall ride experience of the passengers (e.g., the passengers 24, 26, 28, and 30) may be coordinated by the ride and game control system 10. As described in more detail herein, the position/orientation data from the monitoring system 46 and/or the head mounted displays 32 may serve to facilitate synchronization between certain perspectives, such as the view perspective of the passenger and the view perspective of another passenger. Such synchronization may be useful for triangulation of passenger positon based on the known position of certain fixed features (e.g., certain attraction locations), for timing of certain special effects (e.g., real and/or augmented), for modeling of realistic AR effects (e.g., based on physics model), and other effects described below.

Furthermore, the data received in accordance with block 82 may not only be useful for directly impacting a single passenger's experience, but also to facilitate and enhance the physical layout of the real-world and/or simulated environment. For example, the ride and game control system 10 may track historical data, such as locations and views that are the most common across a relatively large sample size (e.g., more than 10, 50, or 100 passengers having corresponding head mounted displays 32) to ensure that passenger notifications are in a conspicuous location. Such data may also be used for selective application of the special effects. For example, the ride and game control system 10 may track the historical data of the user interface 50 and may generate game effects if the passengers are game-players (e.g., if the timing and/or usage of the user interface 50 correspond to the game), and may generate regular show effects if the passengers are not game-players. For example, the ride and game control system 10 may track the passenger's viewing perspectives and may generate special effects (e.g., gaming effects, AR effects) corresponding to the themed attraction if the passengers are looking in the direction of the themed attraction. Additionally, such data may be used to identify locations that are rarely viewed (e.g., based on user view perspectives) to locate areas for hiding certain real-world features (e.g., hide unsightly cables and so forth, or to virtually remove such features, as set forth herein) and/or hiding certain items that may be desirable from an experiential standpoint (e.g., hiding virtual Easter eggs or virtual scavenger hunt items).

The process 80 may include generating (block 84) gaming effects based on the real-time data. In some embodiments, generating gaming effects may include generating on-board entertainment including AR graphics to be displayed on the head mounted display 32. For example, the processor 54 of the computer graphics generation system 52 may generate AR graphics and/or video to be displayed on the one or more displays 74 of the head mounted display 32 based on any one or a combination of factors. Such factors may include the passenger's gaze direction and/or field of view, the passenger's usage of the user interface 50, the passenger's game play history, the position and/or orientation of the ride vehicle 22 along the tracks 20 (or other location when the tracks 22 are not present) at any given time point during a cycle of the ride 14, a predetermined distance traveled by the ride vehicle 22 during a cycle of the ride 14, after a predetermined lapse of time, or after one or more actions have been performed by one or more passengers of the ride vehicle 22. In particular, the processor 54 of the computer graphics generation system 52 may generate overlaid AR features using projection, one or more video merging and/or optical merging techniques, and so forth, such that the passenger may view the AR features displayed on the one or more displays 74 of the head mounted display 32 as an overlay of the passenger's view of the actual and physical real-world environment.

The generation of AR graphics may be used for AR addition of objects from an environment to add objects to the environment, to create games and develop personalized experiences for the themed environment. For example, animated features may be virtually added to the passenger's view on the one or more displays 74 of the head mounted display 32. In some embodiments, generation of the AR graphics may be used for AR removal of objects from an environment, such as to hide unsightly objects from the passenger, or so that certain objects (e.g., special effect features) appear to be floating to enhance the realism of a desired visual effect. For example, a bird or similar animated robotic feature may be suspended by a series of poles and wires, and the poles or wires may be actively removed from the environment so that the bird appears to fly through the air. As another example, certain themed areas may be fenced off by construction fences, which are often viewed as a negative experience. The AR features may be used to virtually remove the construction fence (e.g., the fenced area may be overlaid with environmental features, or transformed into a virtual attraction while construction is underway). Still in further embodiments, the computer graphics generation system 52 may generate realistic AR effects set forth above based on a physics model for simulating and/or timing certain special effects.

In some embodiments, generating gaming effects may include generating or initiating off-board entertainment including visual and/or audible effects using the show effect system 34. For example, the processor 54 of the computer graphics generation system 52 may be programmed to control the operation of the show effect system 34 (e.g., the projection game computer, the one or more display devices 35 and the one or more lighting systems 37) to provide real-world show effects to the passenger. Based on the model of the ride 14, the passenger's location/orientation, the gaze direction, field of view, and other data obtained at block 82, the computer graphics generation system 52 may generate a signal to display scene specific images or video on the one or more display devices 35 and/or to change operation the one or more lighting systems 37 (e.g., change lighting effects, such as lighting directions, timing, intensities, colors, and so forth). In some embodiments, for example, the processor 54 may generate the signals to control the display content and timing of the one or more display devices 35 and may generate signals to control the lighting effects based on any one or a combination of factors. Such factors may include the passenger's gaze direction and/or field of view, the passenger's usage of the user interface 50, the passenger's game play history, the position and/or orientation of the passenger ride vehicle 22 along the tracks 20 (or other location when the tracks 22 are not present) at any given time point during a cycle of the ride 14, a predetermined distance traveled by the ride vehicle 22 during a cycle of the ride 14, after a predetermined lapse of time, or after one or more actions have been performed by one or more passengers of the ride vehicle 22.

In still further embodiments, the processor 54 may generate the signal to control the show effect system 34 based on the generated AR graphics, such that the display content on the one or more displays 35, the lighting effects provided by the one or more lighting systems 37, and the AR graphics shown on the respective head mounted display 32 synchronize with one another. Different aspects of generating the gaming effects will be discussed in more detail with respect to FIGS. 5-8. The process 80 may include transmitting and displaying (block 86) the generated gaming effects to recipients. In particular, the AR graphics and/or control signal generated in block 84 are transmitted to the head mounted display 32 and/or the show effect system 34, respectively.

Figure 5:
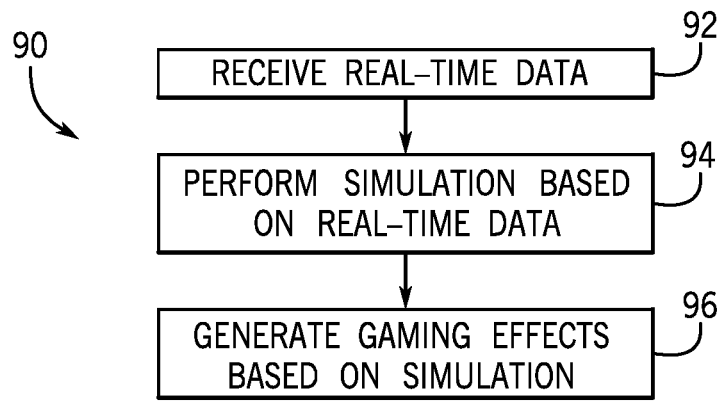
FIG. 5 is a flow diagram illustrating an embodiment of a process for creating realistic AR experience based on simulations using the ride and game control system of FIG. 1, in accordance with present embodiments.

FIG. 5 is a flow diagram illustrating a process 90 for creating realistic AR experiences using the ride and game control system 10. In particular, the process 90 may be considered to represent an embodiment of the manner in which gaming effects are generated in block 84 of the process 80. The process 90 may be representative of initiated code or instructions stored in the memory 56 included in the computer graphics generation system 52. The illustrated process 90 includes receiving (block 92) real-time data from the ride controller 42, the game controller 44, the user interface 50, the monitoring system 46, and/or the head mounted display 32.

The process 90 may also include performing (block 94) simulations based on the received real-time data. As an example, the processor 54 may use a physics model stored in the memory 56 to simulate realistic AR effects. The physics model may be implemented using suitable software or algorithms describing, simulating, and/or illustrating movements and interactions of objects in reality. The physics model may take into account any one or a combination of factors obtained from the real-time data to simulate the movements and interactions of the AR graphics. Such factors may include the passenger's gaze direction and/or field of view, the passenger's position/orientation or change in position/orientation (e.g., moving speed and direction, rotating speed and direction), among other factors that may influence how the passenger may perceive the simulated AR graphics.

The physics model may also take into account the properties of the interacted AR objects and real-world objects. For example, in some embodiments, the computer graphics generation system 52 may use a computer-aided design or similar three-dimensional representation (e.g., digital three-dimensional model) of the real-world environment surrounding the ride to enhance simulations of interactions between real-world objects and computerized effects shown on the head mounted displays 32. For example, real-world environmental features surrounding the ride may be represented from a geometric and material of construction standpoint so that interactions between the real-world features and AR objects can be accurately simulated. In this way, the position, orientation, material construction, and so forth, of the real-world objects may be stored in the memory 56. Specially-configured software of the computer graphics generation system 52 may allow association of the real-world object representations with AR show effects, AR gameplay, and the physics model (or models) that govern the manner in which AR features are generated and updated.

In this respect, the computer graphics generation system 52 may use the physics model to simulate realistic interactions between real objects and computerized objects (e.g., AR objects and real-world objects). As an example, the computer graphics generation system 52 may accurately simulate a computer-generated ball bouncing off of a real-world object, such as a wall. The computer graphics generation system 52 may have a stored representation of the wall, such as its size, shape, and material construction. The computer graphics generation system 52 would account for these variables in simulating an interaction where the ball strikes the wall, for example by simulating realistic deformation of the ball, simulating realistic rebounding of the ball off of the wall, and so forth. The change in momentum, velocity, trajectory, and so on, simulated for the ball would be governed, at least in part, by the physics model of the computer graphics generation system 52.

Once the computer graphics generation system 52 has performed the appropriate simulations, the process 90 may include generating (block 96) gaming effects based on the simulation. In particular, the processor 54 may generate gaming effects using the simulated AR graphics in accordance with aspects of the process 80 discussed in block 84 of FIG. 4.

It should be noted that for a ride in which there is a known motion profile, for example a particular path or set of tracks, certain simulations may be pre-loaded into the computer graphics generation system 52 to reduce computing requirements. For example, as the ride vehicle 22 travels along the path 20, the number of orientations, positions, and velocities of the ride passengers are generally limited. In this respect, the computer graphics generation system 52 may perform comparisons between the information relating to a particular passenger, and a known motion profile (e.g., a profile for which particular simulations have already been performed). In situations where the motion profile matches the known motion profile, the computer graphics generation system 52 may generate graphics according to the simulation that has already been performed.

Further still, in certain embodiments, the AR simulation may also be combined with a real-world effect. For example, if an AR object is simulated to strike a movable real-world object, various actuation devices may be triggered to cause the real-world object to move according to the simulated interaction.

Figure 6:
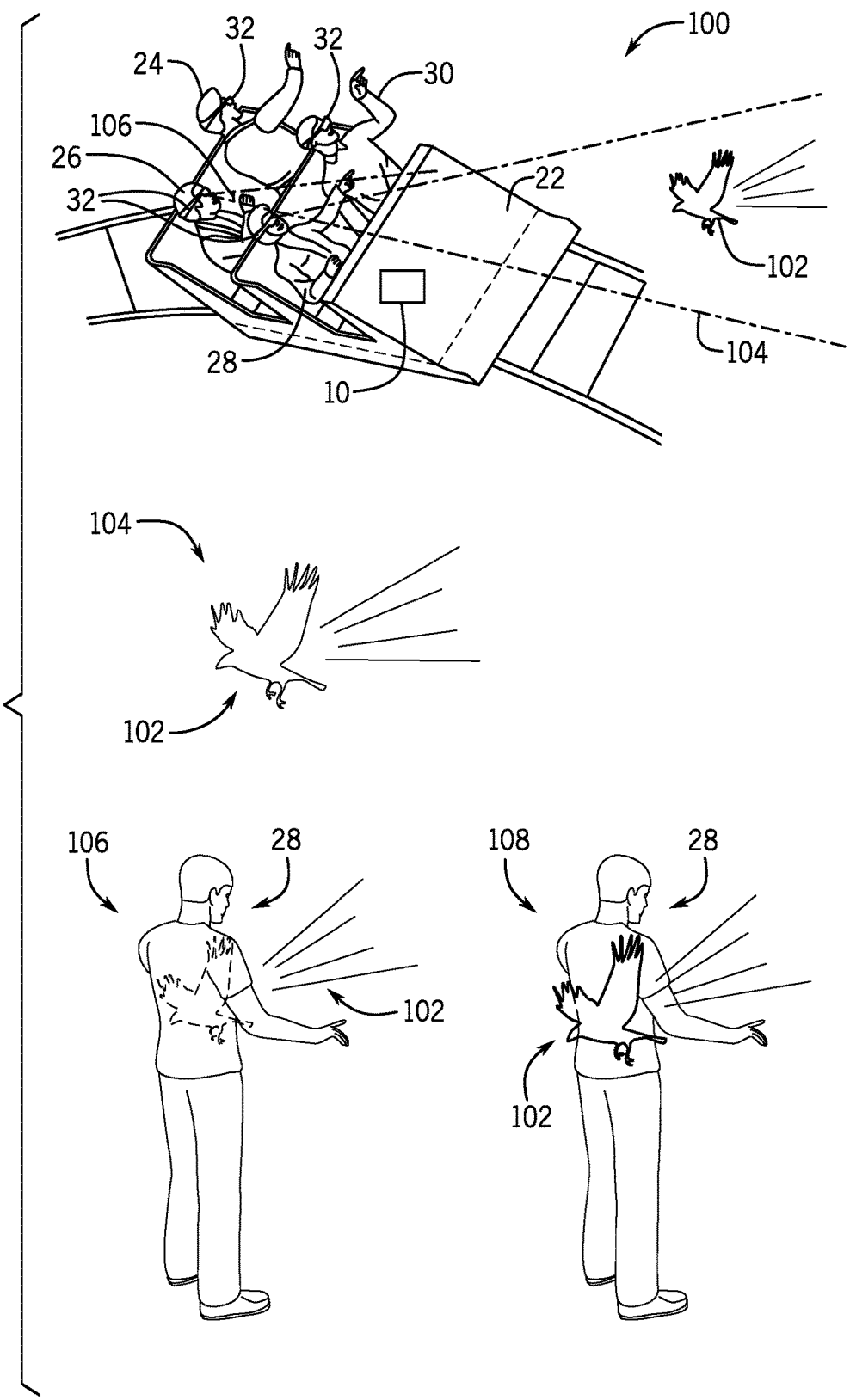
FIG. 6 is a schematic illustrating an example AR experience with perspective adjustments provided by the ride and game control system of FIG. 1, in accordance with present embodiments.
Figure 7:
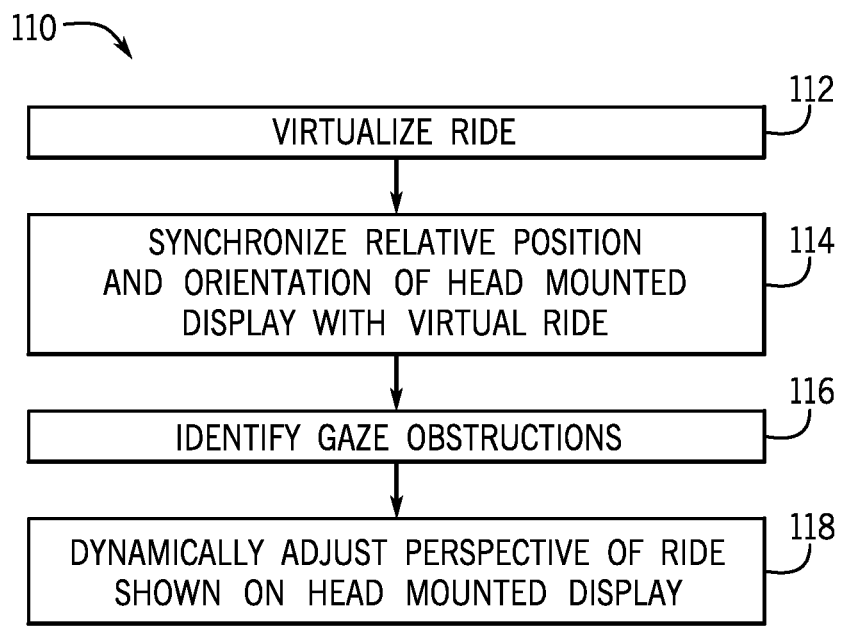
FIG. 7 is a flow diagram of an embodiment of a method for dynamically adjusting ride perspective, in accordance with present embodiments.

FIG. 6 is a schematic illustrating an example AR experience with perspective adjustments rendered by the ride and game control system 10. In the illustrated embodiment, the passenger 26 in a back seat and the passenger 28 in a front seat may view a themed attraction 100 through their respective head mounted displays 32. However, because of the difference in their perspectives (e.g., due to the seat arrangement), the passenger 26 may not fully experience the ride as compared to the passenger 28 who has a relatively better view. For example, the themed attraction 100 may include a real-world feature 102 (e.g., a flying bird) that may be a real-world object or an image displayed on the one or more display devices 35. Because the passenger 28 is in the front row, the passenger 28 may have an unobstructed angle of view 104 (e.g., not blocked by any intervening objects) of the real-world feature 102. However, the passenger 26 in the back row may have an obstructed field of view 106 because at least a portion of the real-world feature 102 is blocked by the passenger 28.

In accordance with one embodiment of the present disclosure, the ride and game control system 10 may perform simulations to allow a passenger to experience certain portions of the ride from another perspective. In particular, based on the obtained real-time data (e.g., obtained from the ride controller 42, the game controller 44, the head mounted display 32, and/or the monitoring system 46), the ride and game control system 10 may determine that the field of view 106 of the passenger 26 is at least partially blocked. In response to this determination, the ride and game control system 10 may generate gaming effects to provide an adjusted perspective 108 and display the generated gaming effects on the respective head mounted display 32 of the passenger 26, such that the passenger 26 may have an unobstructed view of the real-world feature 102. For example, the generated gaming effects may include virtual adjustment to the position of the real-world feature 102, such that it is brought in front of the passenger's 26 eyes while the passenger 26 may still see the passenger 28. In some embodiments, the generated gaming effects in the adjusted perspective 108 may include AR features illustrating the perspective of the passenger 28 (e.g., the field of view 104).

The manner in which perspective adjustments are made may depend on a number of factors. One example of a method 110 for dynamically adjusting ride perspective is illustrated as a flow diagram in FIG. 7. As illustrated, the method 110 includes virtualizing (block 112) a ride. For example, the ride may be virtualized by storing computer graphics representations of the ride, its surrounding environment, and show effects in memory (e.g., the memory 56). The show effects may be real-world or virtual effects (e.g., AR effects), and the computer graphics representations may be surface representations that are true to relative size, position, and so forth. The acts represented by block 112 may also include simulating and storing a known motion profile for the ride, and view perspectives for the known motion profile in memory (e.g., the memory 56). In this way, a known motion profile and the show effects that would be seen along this known motion profile are stored in memory (e.g., the memory 56) and are accessible to allow for future display and/or overlay.

The illustrated method 110 also includes synchronizing (block 114) the position and orientation of a particular one of the head mounted displays 32 to the stored virtual ride profile (the known profile). For example, synchronizing in accordance with the acts of block 114 may include synchronizing the timing of the identified gaze of the head mounted display 32 with the stored virtual ride profile. As another example, the synchronization may include synchronizing position and rotation as measured by sensors on the head mounted display 32 with the known ride profile. This allows the computer graphics generation system 52 to compare and identify differences between the view perspectives of the head mounted display 32 with the view perspectives of the known ride profile. Using these differences, appropriate amounts of perspective adjustments may be identified to allow the computer graphics generation system 52 to adjust the augmentations displayed on the head mounted display 32 to correspond more closely to the view perspectives of the known ride profile.

To identify whether perspective adjustments are appropriate, the computer graphics generation system 52 may, for example, monitor the aspects of the head mounted displays 32 to identify (block 116) potential gaze obstructions. For example, the motion profile of the ride vehicle 22 and desired view perspectives (e.g., including a view of attraction features) of the passengers may be known. This allows the computer graphics generation system 52 to identify, at a certain time during the ride, that a potential gaze obstruction would prevent one of the passengers from having a full view of a particular attraction feature. As an example, the computer graphics generation system 52 may identify the potential gaze obstruction due to a combination of factors, such as seat position and the presence of other passengers, fixed features of the ride and their known position, and so forth.

In response to identifying potential gaze obstructions or similar situations where a passenger (a particular head mounted display 32) may not have a full view of attraction features, the computer graphics generation system 52 may dynamically adjust (block 118) the perspective of at least a portion of the ride shown on the head mounted display 32. As an example, the computer graphics generation system 52 may shift a location of a particular virtual augmentation (or locations of multiple augmentations) so that it is in full view of the passenger for whose perspective would otherwise be blocked by other passengers or environmental ride elements.

Figure 8:
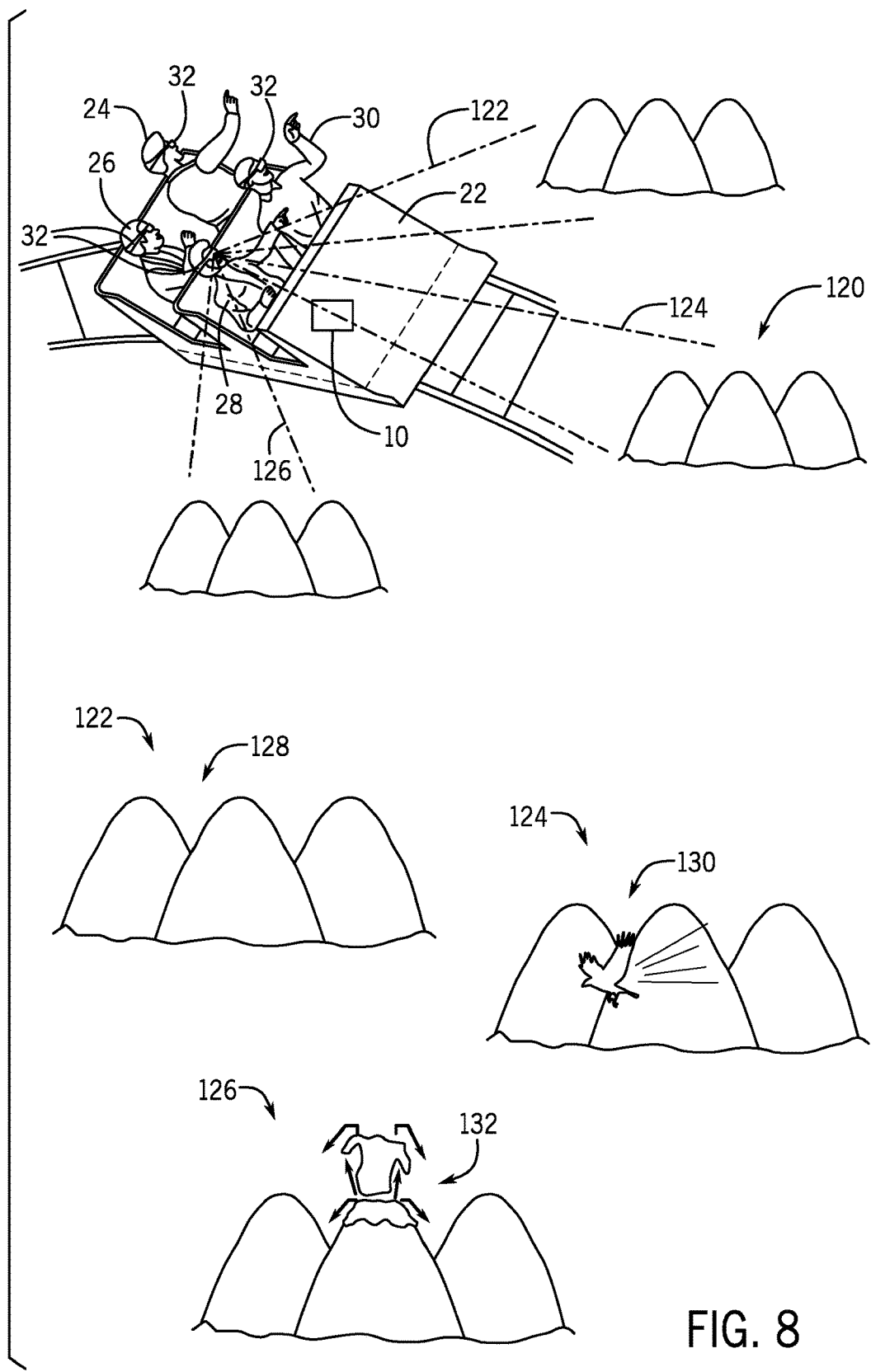
FIG. 8 is a schematic illustrating an example AR experience with dynamic interactivity provided by the ride and game control system of FIG. 1, in accordance with present embodiments.

FIG. 8 is a schematic illustrating an example AR experience with dynamic interactivity rendered by the ride and game control system 10 in accordance with present embodiments. In the illustrated embodiment, the passenger 28 wearing the head mounted display 32 may view a themed attraction 120 (e.g., volcanos) that may include real-world features (e.g., real-world objects or images displayed on the one or more display devices 35) and/or AR features. During the course of the ride, the passenger 28 may gaze in different directions and may change perspective from a first field of view 122 to a second field of view 124 to a third field of view 126. In accordance with one embodiment of the present disclosure, the ride and game control system 10 may render gaming effects in a dynamic manner based on the passenger's field of view. In this example, in response to determining that the passenger 28 has a gaze in the first field of view 122, the ride and game control system 10 may not render AR features, such that the passenger 28 wearing the head mounted display 32 may only see dormant volcanos 128. In response to determining that the passenger 28 has a gaze in the second field of view 124, the ride and game control system 10 may render AR features 130, such that the passenger 28 wearing the head mounted display 32 may see a bird flying around the volcanos. In response to determining that the passenger 28 has a gaze in the third field of view 126, the ride and game control system 10 may render AR features 132, such that the passenger 28 wearing the head mounted display 32 may see erupting volcanos.

In some embodiments, the ride and game control system 10 may also change the one or more lighting systems 37 and/or other show effects (e.g., sound effects) based on the rendered AR features. For example, the ride and game control system 10, in response to determining that the passenger 28 has a gaze in the second field of view 124, may change the lighting condition (e.g., lighting intensities, directions, colors, etc.) of the one or more lighting systems 37 to accentuate the rendered AR features 130 (e.g., the flying bird). For example, the ride and game control system 10, in response to determining that the passenger 28 has a gaze in the third field of view 126, may change the lighting condition (e.g., lighting intensities, directions, colors, etc.) of the one or more lighting systems 37 and/or may change sound effects (e.g., provided via sound effect devices of the head mounted display 32 or of the show effect system 34) to reflect the specific scene of the volcano eruption.

In some embodiments, the ride and game control system 10 may render AR features in response to determining that at least a threshold number (e.g., 2, 4, 6, 10 or more) of passengers show viewing interests. For example, the ride and game control system 10 may render the AR features 132 (e.g., erupting volcanos), only in response to determining that at least two passengers (e.g., the passengers 26 and 28) are gazing in the field of view 126. It should be appreciated that the threshold number may be scene specific. For example, the threshold number for the AR features 132 (e.g., erupting volcanos) may be two, and the threshold number for the AR features 130 (e.g., flying bird) may be four.

Figure 9:
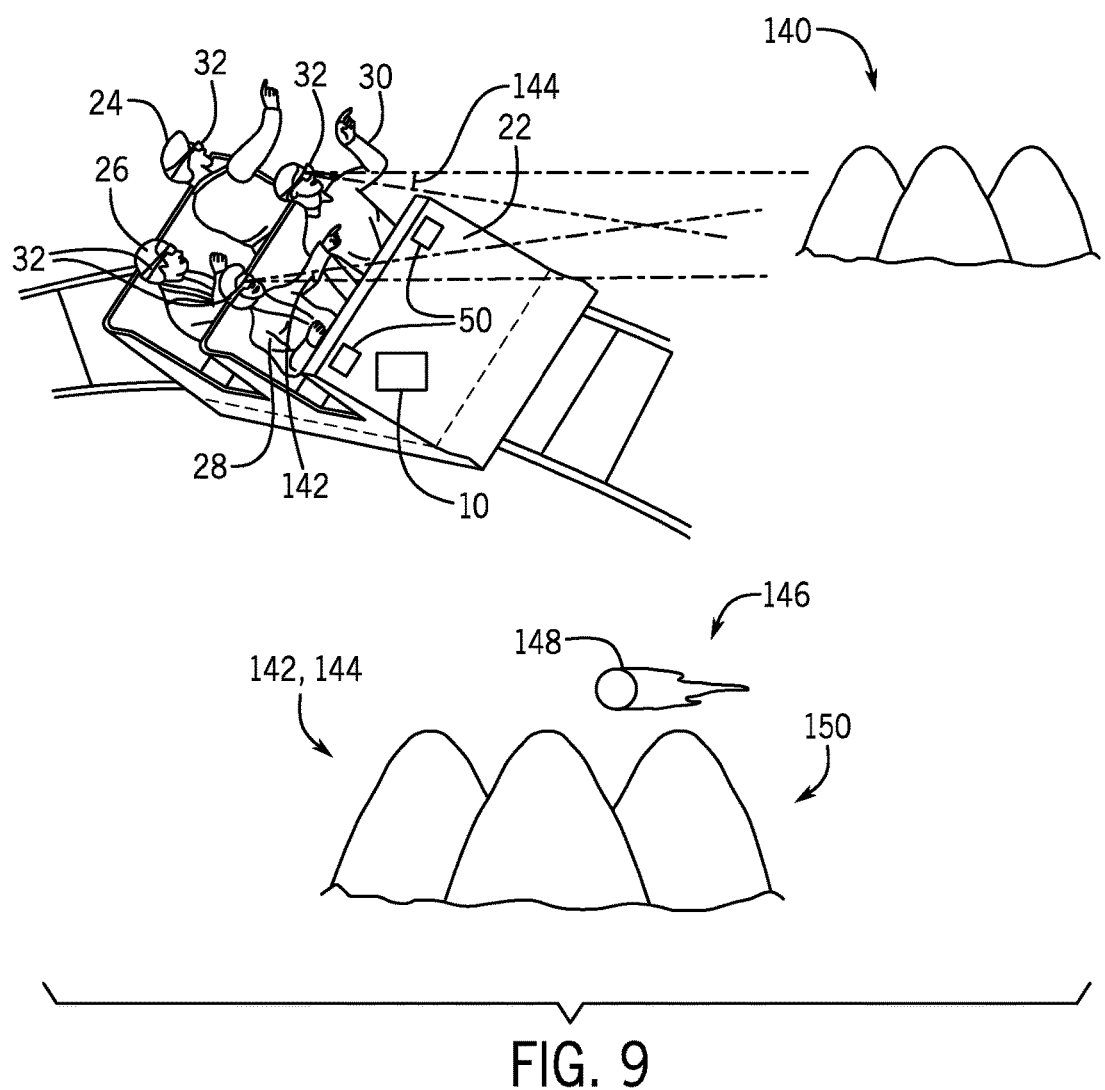
FIG. 9 is a schematic illustrating an example AR experience where multiple passengers share the same AR experience provided by the ride and game control system of FIG. 1, in accordance with present embodiments.

FIG. 9 is a schematic illustrating an example of connectivity/engagement between multiple game systems 48 of the ride and game control system 10. In the illustrated embodiment, the one or more game systems 48 (shown in FIG. 2) of the ride and game control system 10, disposed within a single ride vehicle 22 (operated by the passengers 24, 26, 28, and 30), are communicatively and operatively coupled to one another.

Both of the passengers 28 and 30 may gaze in substantially the same direction at a themed attraction 140 (e.g., volcanos) that may include real-world features (e.g., real-world objections or images displayed on the one or more display devices 35) and/or AR features. For example, in response to determining that a field of view 142 of the passenger 28 overlaps a portion of an field of view 144 of the passenger 30, the ride and game control system 10 may render the same AR features to be shown on the respective head mounted displays 32 of the passengers 28 and 30, but from different perspectives. Furthermore, both of the passengers 28 and 30 may see actions 146 (e.g., actions in the AR environment) applied by either of the passengers 28 and 30 on the respective user interface 50 of the game system 48. In the illustrated example, the passenger 28 operates the respective user interface 50 to execute the actions 146, such as shooting a fire ball 148 at volcanos 150. For example, the passenger 28 may adjust operation of the respective user interface 50 to change the flying trajectory of the fire ball 148. Correspondingly, the passenger 30, from the respective head mounted display 32, may see the action 146 (e.g., shooting the fire ball 148 at the volcanos 150) applied by the passenger 28. In some embodiments, the ride and game control system 10 may determine that the passenger 30 is engaged in the same game as the passenger 28 (e.g., the passenger 30 may provide an indication using the user interface 50 to consent joining the game with the passenger 28), and in response to this determination, the ride and game control system 10 may display the same AR features including the results of the actions 146 on the respective head mounted displays 32 of the passengers 28 and 30.

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure. Further, it should be understood that certain elements of the disclosed embodiments may be combined or exchanged with one another.

The invention claimed is:

1. A ride system, comprising:
a ride vehicle configured to accommodate a passenger and to travel along a ride path during a ride in an amusement park;
a head mounted display connected to the ride vehicle and configured to be worn by the passenger; and
a tide and game control system integrated with the ride vehicle and configured to coordinate a ride experience of the passenger with events occurring during the ride using at least the head mounted display and the ride vehicle, wherein the ride and game control system comprises:
a user interface configured to receive inputs from the passenger;
a ride controller configured to control physical operation of the ride vehicle based at least on data relating to operational parameters of the ride vehicle and the inputs from the passenger;
a monitoring system configured to monitor at least a position and an orientation of the head mounted display, a position and an orientation of the ride vehicle, or a combination thereof; and
a computer graphics generation system communicatively coupled to the head mounted display and configured to selectively generate augmented reality (AR) features for display on the head mounted display based on data received from the ride controller, the monitoring system, the user interface, or any combination thereof, and to provide a specific AR experience associated with a particular real-world feature to the passenger in response to a determination that more than a threshold number of additional passengers in the tide vehicle are gazing at the particular real-world feature.

2. The ride system of claim 1, wherein the computer graphics generation system is configured to selectively generate the AR features based at least on data indicative of the position, a yaw, and a velocity of the ride vehicle received from the monitoring system.

3. The ride system of claim 1, wherein the monitoring system comprises one or more orientation and position sensors, one or more motion tracking sensors, one or more inertial measurement units, one or more presence sensors, or a combination thereof.

4. The ride system of claim 1, wherein the computer graphics generation system is configured to perform perspective adjustments to the AR features in response to determining that the passenger has an obstructed field of view.

5. The ride system of claim 4, wherein the computer graphics generation system is configured to perform perspective adjustments to the AR features so that the passenger has an unobstructed view of the AR features.

6. The ride system of claim 1, wherein the ride and game control system is configured to provide a unique AR experience to the passenger that corresponds to identifying information relating to the passenger.

7. The ride system of claim 1, wherein the computer graphics generation system is configured to generate the AR features based on simulations of one or more physics models and a digital three-dimensional model of an environment surrounding the ride vehicle.

8. The ride system of claim 1, comprising a show effect system communicatively coupled to the ride and game control system, wherein the show effect system comprises a display device and a lighting system disposed along the ride path.

9. The ride system of claim 8, wherein the show effect system is configured to change operation of the display device, operation of the lighting system, or both, based on data from the ride controller, the monitoring system, the user interface, or a combination thereof.

10. A method, comprising:
receiving and analyzing data via a ride and game control system integrated with a ride vehicle configured to accommodate one or more passengers, wherein the ride vehicle is configured to travel along a ride path during a ride in an amusement park, and wherein the data relates to the one or more passengers, the ride vehicle, or both;
determining, via the ride and game control system, whether a first real-world object in an environment surrounding the ride vehicle is at least partially occluded to a respective passenger of the one or more passengers by a second real-world object in the environment based on the data;
generating, via a computer graphics generation system of the ride and game control system, gaming effects based on the data, wherein the gaming effects comprise augmented reality (AR) graphics of the first real-world object generated in response to identification that the first real-world object is at least partially occluded to the respective passenger; and
transmitting, via the computer graphics generation system, the AR graphics of the first real-world object for display on a head mounted display configured to be worn by the respective passenger in the tide vehicle to perform a perspective adjustment for the respective passenger by overlaying the AR graphics of the first real-world object onto a field of view of the respective passenger such that the AR graphics of the first real-world object are overlaid onto the second real-world object, the environment or both.

11. The method of claim 10, wherein receiving the data comprises receiving real-time data collected via one or more orientation and position sensors, one or more motion tracking sensors, one or more inertial measurement units, one or more presence sensors, or any combination thereof.

12. The method of claim 10, comprising displaying, via the head mounted display, the AR graphics on one or more displays of the head mounted display, wherein the head mounted display is physically coupled to the ride vehicle.

13. The method of claim 10, wherein generating the gaming effects comprises generating the AR graphics based on simulations of one or more physics models and a digital three-dimensional model of the environment surrounding the ride vehicle.

14. The method of claim 10, comprising displaying visualization graphics on one or more displays disposed along the ride path, changing operation of one or more lighting systems disposed along the ride path, or both, based on the data, using a show effect system in communication with the ride and game control system, wherein the show effect system is separate from the ride vehicle.

15. A ride and game control system physically integrated with a ride vehicle configured to carry a passenger along a ride path, the ride and game control system comprising:
a ride controller configured to receive real-time data related to an input control state from at least a user interface and to receive data related to operational parameters of the ride vehicle;

a game controller communicatively coupled to the ride controller and configured to push updates relating to the input control state and at least one of the operational parameters to features of the ride vehicle; and a computer graphics generation system communicatively coupled to the game controller and to a head mounted display configured to be worn by the passenger, wherein the computer graphics generation system is configured to selectively render augmented reality (AR) graphics for display on the head mounted display based at least on the updates from the game controller, and wherein the game controller is configured to adjust a lighting system disposed along the ride path based on the AR graphics and a gaze direction of the passenger to accentuate the AR graphics as overlaid onto a field of view of the passenger by the head mounted display.

16. The ride and game control system of claim 15, wherein the ride vehicle is configured to carry multiple passengers along the ride path, and wherein the ride and game control system comprises multiple computer graphics generation systems that are each configured to receive the updates from the game controller to render corresponding AR graphics that are unique to a perspective of each passenger of the multiple passengers for display on respective head mounted displays of the multiple passengers.

17. The ride and game control system of claim 16, wherein the game controller is configured to:

provide a summed game state of the ride vehicle to a server located off-board of the ride vehicle; and provide scene-specific gaming events to a projection game computer or a show effect system, or both, located off-board of the ride vehicle.

18. The ride and game control system of claim 15, comprising a monitoring system having one or more orientation and position sensors, one or more motion tracking sensors, one or more inertial measurement units, one or more presence sensors, or a combination thereof, wherein the monitoring system is configured to provide feedback to the game controller, the feedback indicative of the gaze direction of the passenger.

* * * * *

UNITED STATES PATENT AND TRADEMARK OFFICE
CERTIFICATE OF CORRECTION

PATENT NO. : 10,528,123 B2
APPLICATION NO. : 15/909694
DATED : January 7, 2020
INVENTOR(S) : Sean David McCracken et al.

Page 1 of 1

It is certified that error appears in the above-identified patent and that said Letters Patent is hereby corrected as shown below:

In the Claims

In Column 17, Line 36, in Claim 1, delete "tide" and insert -- ride --, therefor.

Signed and Sealed this
Twenty-fifth Day of February, 2020

Andrei Iancu
*Director of the United States Patent and Trademark Office*